United States Patent
Duchastel et al.

(10) Patent No.: US 9,703,581 B2
(45) Date of Patent: Jul. 11, 2017

(54) MANAGING UNALLOCATED SERVER FARMS IN A DESKTOP VIRTUALIZATION SYSTEM

(75) Inventors: Thierry Duchastel, Ft. Lauderdale, FL (US); Thomas Kludy, Cooper City, FL (US)

(73) Assignee: CITRIX SYSTEMS, INC., Ft. Lauderdale, FL (US)

( * ) Notice: Subject to any disclaimer, the term of this patent is extended or adjusted under 35 U.S.C. 154(b) by 633 days.

(21) Appl. No.: 13/475,299

(22) Filed: May 18, 2012

(65) Prior Publication Data

US 2012/0297069 A1  Nov. 22, 2012

Related U.S. Application Data

(60) Provisional application No. 61/488,602, filed on May 20, 2011.

(51) Int. Cl.
*G06F 15/173* (2006.01)
*G06F 9/455* (2006.01)
*H04L 29/08* (2006.01)

(52) U.S. Cl.
CPC .......... *G06F 9/45533* (2013.01); *H04L 67/10* (2013.01)

(58) Field of Classification Search
CPC .............................. G06F 9/45533; H04L 67/10
USPC ........................................................ 709/226
See application file for complete search history.

(56) References Cited

U.S. PATENT DOCUMENTS

| | | | |
|---|---|---|---|
| 2008/0201711 A1* | 8/2008 | Amir Husain | 718/1 |
| 2011/0213885 A1* | 9/2011 | Kelkar | G06F 9/5072 709/226 |
| 2011/0213886 A1* | 9/2011 | Kelkar | G06F 9/5072 709/226 |
| 2011/0214010 A1* | 9/2011 | Aggarwal et al. | 714/4.11 |
| 2011/0321033 A1* | 12/2011 | Kelkar | G06F 9/44505 717/174 |

* cited by examiner

*Primary Examiner* — Kevin Mai
(74) *Attorney, Agent, or Firm* — Banner & Witcoff, Ltd.

(57) ABSTRACT

Methods and systems for managing the allocated and unallocated server farms in a desktop virtualization system are provided herein. A server farm management device may store and maintain one or more unallocated server farm thresholds for the desktop virtualization system. The current number of unallocated server farms may be determined in response to a trigger or according to a predetermined schedule. When the number of unallocated server farms falls below a threshold, one or more new unallocated server farms may be created using the available servers in the desktop virtualization system. Thresholds may relate to overall number of unallocated server farms in the desktop virtualization system, as well as to the numbers of unallocated server farms of certain types or having certain characteristics.

15 Claims, 6 Drawing Sheets

MANAGING UNALLOCATED SERVER FARMS IN A DESKTOP VIRTUALIZATION SYSTEM

RELATED APPLICATIONS

The present application is a non-provisional of U.S. Patent Application No. 61/488,602, entitled "Method for Pre-Deploying the Infrastructure Needed to Host Remote Applications and Services on a Per-Tenant Basis," filed May 20, 2011, the contents of which are incorporated herein by reference in their entirety for all purposes.

FIELD

This application generally relates to computers and computer networks. In particular, this application relates to methods and systems for monitoring and managing numbers of allocated and unallocated server farms in a desktop virtualization system.

BACKGROUND

Traditionally, personal computers included operating systems, applications, and user settings for a single user. Personal computers were generally both used and managed by their owners. However, many organizations are now using virtualization, remote access and/or clouds of computing resources to fulfill their computing needs. Desktop virtualization systems, such as cloud computing environments, generally allow for the operating systems, applications, and user settings of multiple users to be included on a single physical machine. Desktop virtualization technology allows multiple instances of an operating system to be kept separate, so the activities of one user do not affect the experiences of other users. Desktop virtualization systems allow for computers owned by a cloud service provider (CSP) to be managed by the CSP but used by customers (or tenants) of the CSP.

In some instances, the CSP may create a set of server farms so that each server farm includes a separate and isolated hosting infrastructure to serve one or more tenants of the CSP. Individual server farms may host multiple tenants and may be generally configured to support the virtualization computing needs of those tenants. Other server farms may be used exclusively by one tenant, for example, a large scale or highly secure customer, and may be specifically configured based on the needs of that single tenant. However, the creation of server farms can be a time consuming and tedious process.

SUMMARY

In light of the foregoing background, the following presents a simplified summary of the present disclosure in order to provide a basic understanding of some aspects described herein. This summary is not an extensive overview, and it is not intended to identify key or critical elements or to delineate the scope of the claims. The following summary merely presents various described aspects in a simplified form as a prelude to the more detailed description provided below.

According to certain aspects of the disclosure, a device such as a server farm management device may be configured (e.g., using software) to manage the allocated and unallocated server farms in a desktop virtualization system. The server farm management device may store and maintain an unallocated server farm threshold for the desktop virtualization system. The server farm management device may then determine the current number of unallocated server farms. If the number of unallocated server farms in the desktop virtualization system has fallen below the threshold, the server farm management device may create one or more new unallocated server farms using the available servers in the desktop virtualization system. By maintaining a minimum number of unallocated server farms, new or existing tenants that require an exclusive server farm may be quickly assigned to a previously created unallocated server farm, rather than requiring the tenant to wait for a new unallocated server farm to be created at the time when the server farm is requested.

According to some aspects, multiple different unallocated server farm thresholds may be maintained and enforced by the server farm management device. Certain thresholds may relate to overall number of unallocated server farms in the desktop virtualization system. Other thresholds may relate to the numbers of unallocated server farms of certain types or having certain characteristics. For example, the server farm management device may enforce thresholds for unallocated server farms having a certain numbers of servers, certain isolation modes, certain sets of client applications, certain load balancing and/or election policies, and/or other server farm characteristics.

According to various aspects, the process for managing unallocated server farms may be performed based on the detection of a trigger or according to a predetermined time schedule. Triggers may detect the allocation or deallocation of server farms to tenants in the desktop virtualization system. For example, the server farm management device may be configured to perform management processes for creating or destroying unallocated server farms after detecting that a previously unallocated server farm has been recently allocated to a tenant.

BRIEF DESCRIPTION OF THE DRAWINGS

Figure 1:
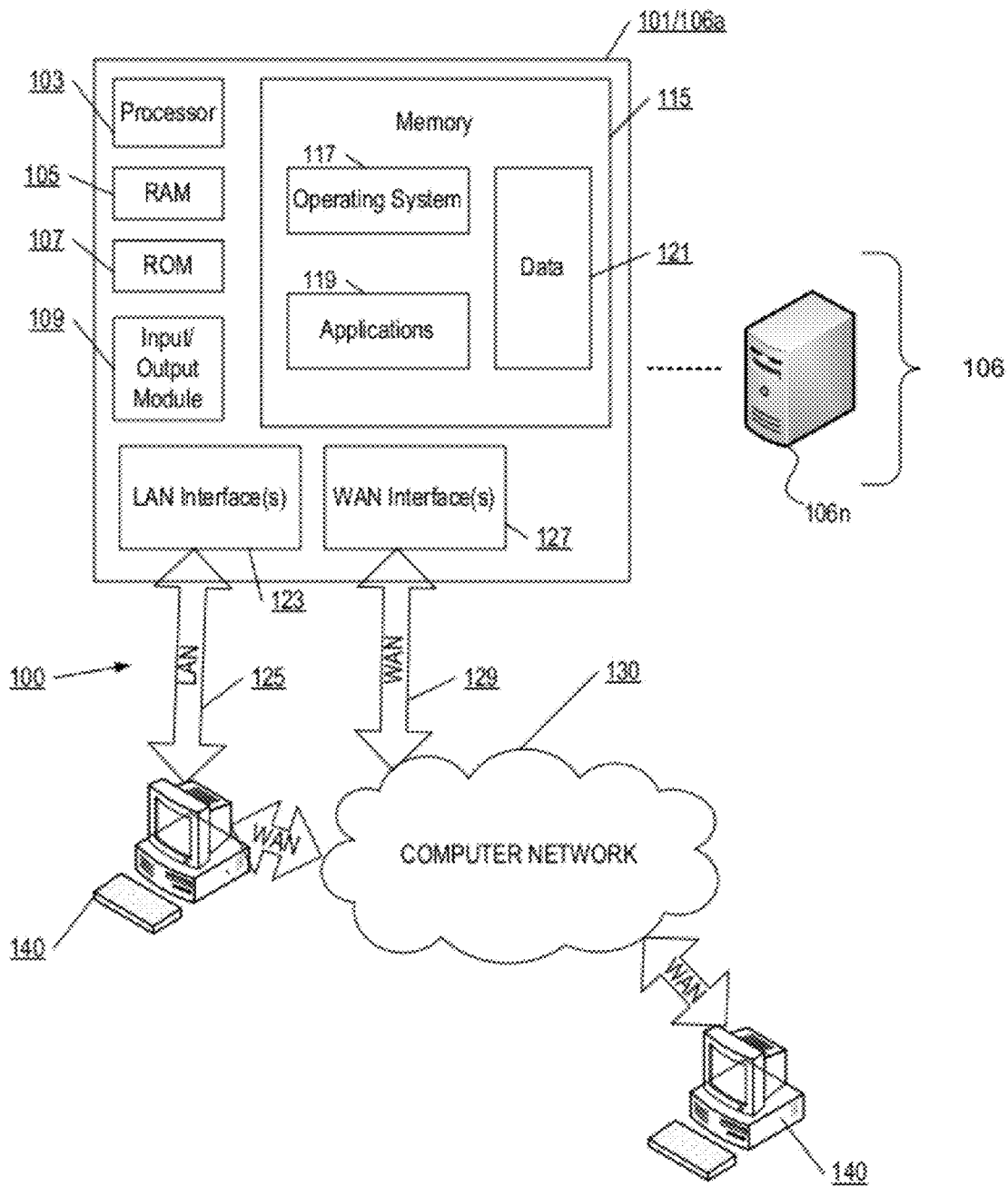

Having thus described aspects of the disclosure in general terms, reference will now be made to the accompanying drawings, which are not necessarily drawn to scale, and wherein:

FIG. 1 illustrates an example operating environment in which various aspects of the disclosure may be implemented.

Figure 2:
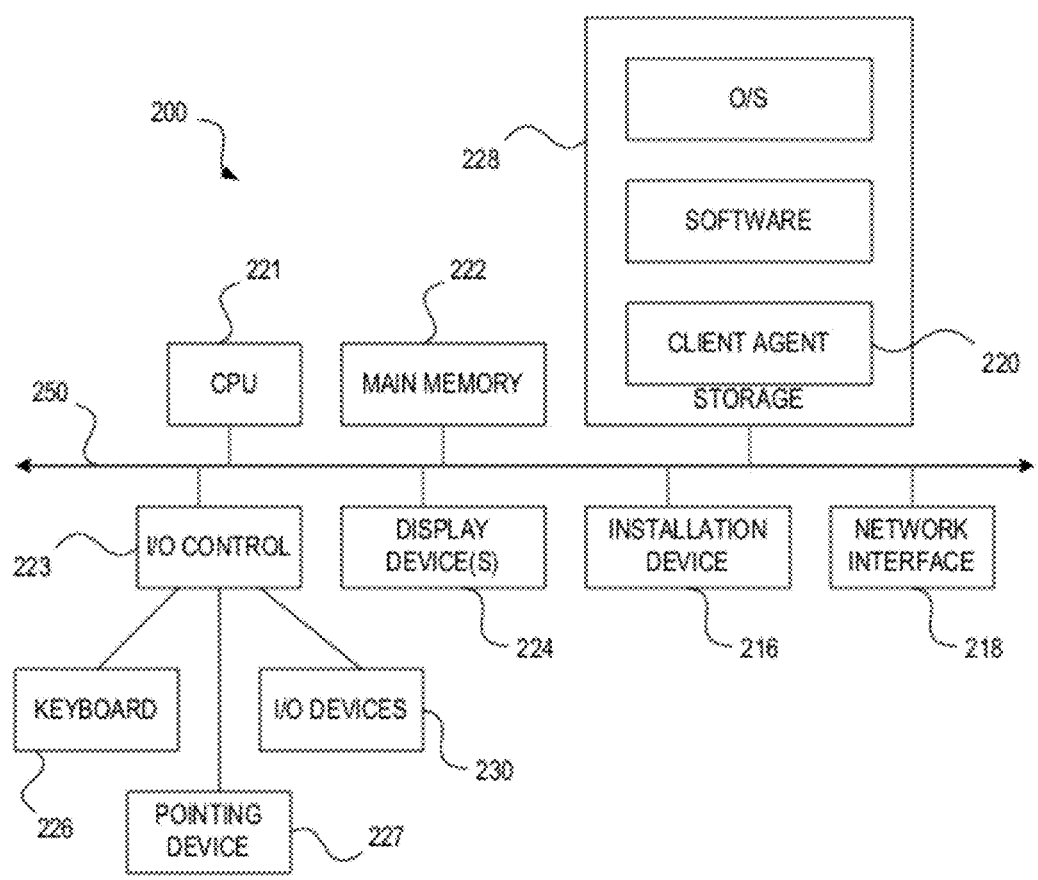

FIG. 2 illustrates a computing device that may be used in accordance with one or more illustrative aspects described herein.

Figure 3:
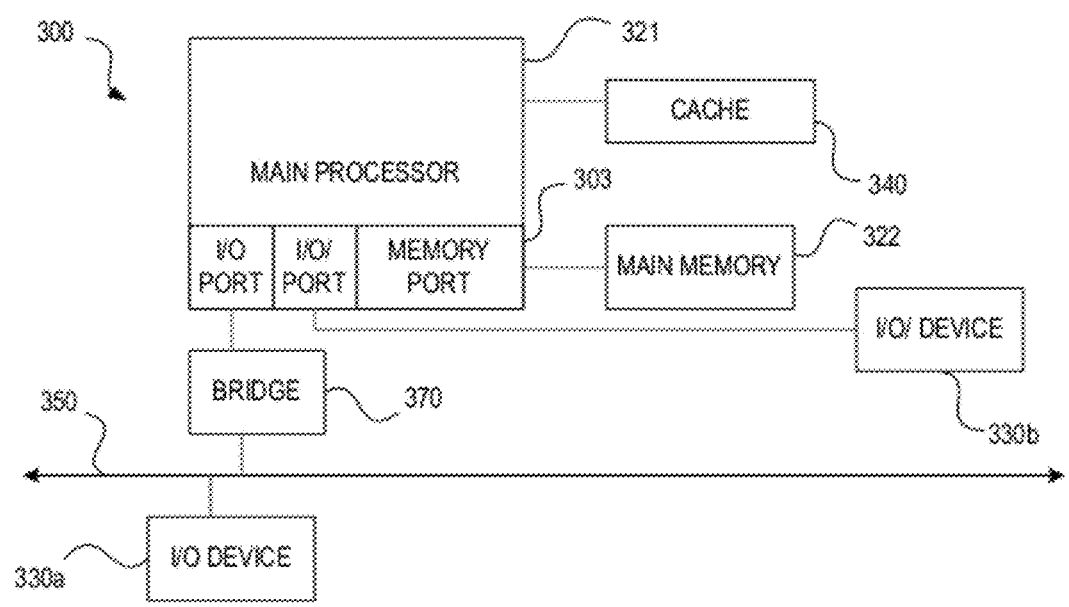

FIG. 3 illustrates a computing device that may be used in accordance with one or more illustrative aspects described herein.

Figure 4:
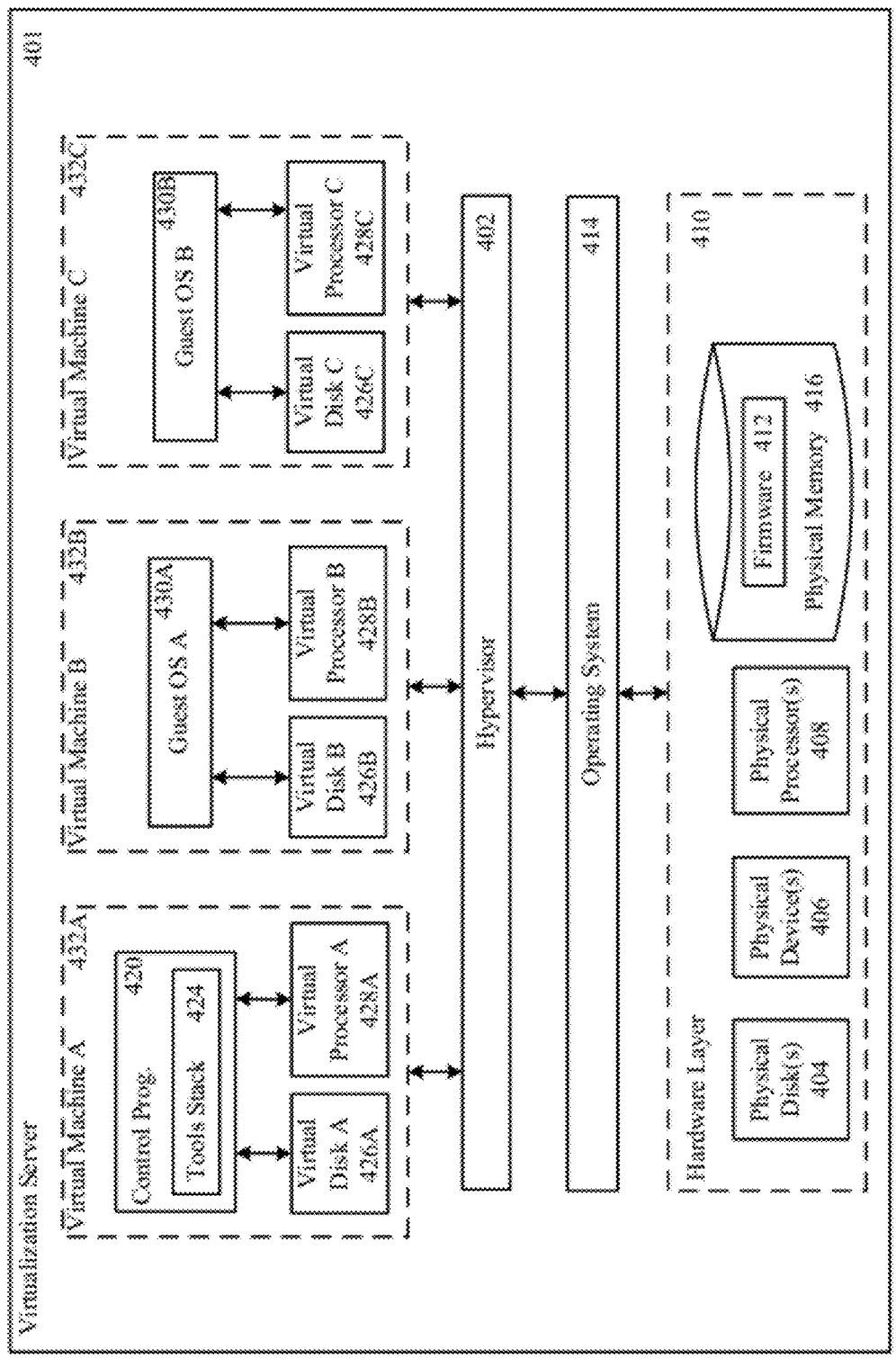

FIG. 4 is a block diagram that depicts embodiments of a virtualization server in accordance with one or more illustrative aspects described herein.

Figure 5:
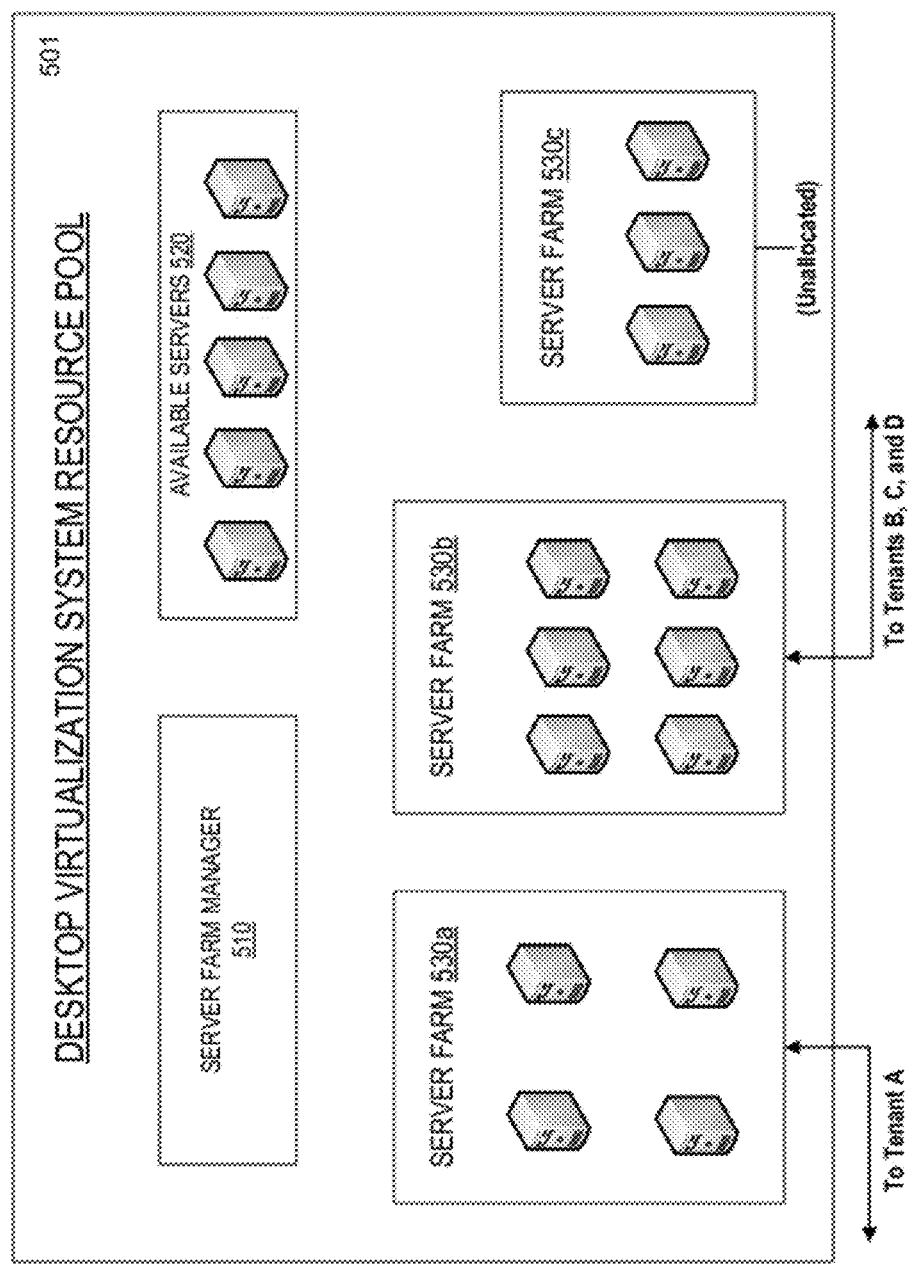

FIG. 5 is a block diagram that depicts embodiments of a server farm manager for a desktop virtualization system resource pool in accordance with one or more illustrative aspects described herein.

Figure 6:
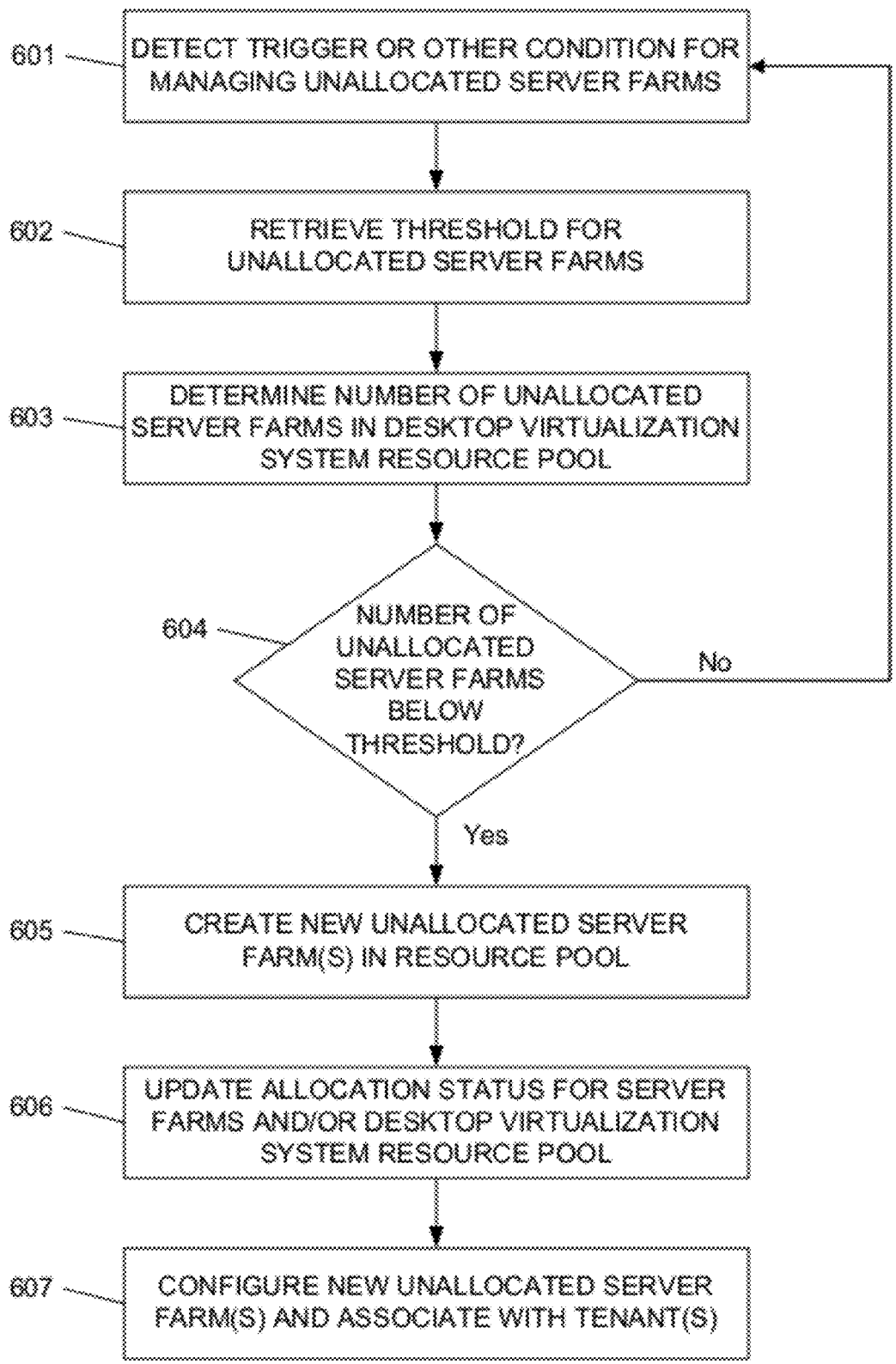

FIG. 6 illustrates a method of managing unallocated server farms according to one or more aspects described herein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 illustrates an example block diagram of a generic computing device 101 (e.g., a computer server 106a) in an example computing environment 100 that may be used according to one or more illustrative embodiments of the disclosure. According to one or more aspects, generic computing device 101 may be a server 106a in a single-server or multi-server desktop virtualization system (e.g., a cloud system) configured to provide virtual machines for client access devices. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 140 (also referred to as client devices). The terminals 140 may be personal computers or servers that include many or all of the elements described above with respect to the generic computing device 101. The network connections depicted in FIG. 1 include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as computer network 130 (e.g., the Internet). It will be appreciated that the network connections shown are illustrative and other means of establishing a communications link between the computers may be used.

Generic computing device 101 and/or terminals 140 may also be mobile terminals (e.g., mobile phones, smartphones, PDAs, notebooks, etc.) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, one or more client devices 140 may be in communication with one or more servers 106a-106n (generally referred to herein as "server(s) 106"). In one embodiment, the computing environment 100 can include an appliance installed between the server(s) 106 and client machine(s) 140. This appliance can manage client/server connections, and in some cases can load balance client connections amongst a plurality of backend servers 106.

The client machine(s) 140 can in some embodiment be referred to as a single client machine 140 or a single group of client machines 140, while server(s) 106 may be referred to as a single server 106 or a single group of servers 106. In one embodiment a single client machine 140 communicates with more than one server 106, while in another embodiment a single server 106 communicates with more than one client machine 140. In yet another embodiment, a single client machine 140 communicates with a single server 106.

A client machine 140 can, in some embodiments, be referenced by any one of the following terms: client machine(s) 140; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client 140.

The client machine 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 140 that displays application output generated by an application remotely executing on a server 106 or other remotely located machine. In these embodiments, the client device 140 can display the application output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106, for example, in a cloud computing environment. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc.; Riverbed Technology, Inc.; F5 Networks, Inc.; or Juniper Networks, Inc. Some embodiments include a first server 106A that receives requests from a client machine 140, forwards the request to a second server 106n, and responds to the request generated by the client machine 140 with a response from the second server 106n. The first server 106A can acquire an enumeration of applications available to the client machine 140 and well as address information associated with an application server 106 hosting an application identified within the enumeration of applications. The first server 106A can then present a response to the client's request using a web interface, and communicate directly with the client 140 to provide the client 140 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 140 can, in some embodiments, be a client node that seeks access to resources provided by a server 106. In other embodiments, the server 106 may provide clients 140 or client nodes with access to hosted resources. The server 106, in some embodiments, functions as a master node such that it communicates with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

One or more clients 140 and/or one or more servers 106 can transmit data over a network 130 installed between machines and appliances within the computing environment 100. The network 130 can comprise one or more sub-networks, and can be installed between any combination of the clients 140, servers 106, computing machines and appliances included within the computing environment 100. In some embodiments, the network 130 can be: a local-area network (LAN); a metropolitan area network (MAN); a wide area network (WAN); a primary network 104 comprised of multiple sub-networks located between the client machines 140 and the servers 106; a primary public network 130 (e.g., the Internet) with a private sub-network; a primary private network 130 with a public sub-network; or a primary private network 130 with a private sub-network. Still further embodiments include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, possible network topologies include: a bus network topology; a star network topology; a ring network topology; a repeater-based network topology; or a tiered-star network topology. Additional embodiments may include a network of mobile telephone networks that use a protocol to communicate among mobile devices, where the protocol can be any one of the following: AMPS; TDMA; CDMA; GSM; GPRS UMTS; or any other protocol able to transmit data among mobile devices.

Illustrated in FIG. 2 is an embodiment of a computing device 200, where the client machine 140 and server 106 illustrated in FIG. 1 may be deployed as and/or executed on any embodiment of the computing device 200 illustrated and described herein. Included within the computing device 200 is a system bus 250 that communicates with the following components: a central processing unit 221; a main memory 222; storage memory 228; an input/output (I/O) controller 223; display devices 224A-224N; an installation device 216; and a network interface 218. In one embodiment, the storage memory 228 includes: an operating system, software routines, and a client agent 220. The I/O controller 223, in some embodiments, is further connected to a keyboard 226, and a pointing device 227. Other embodiments may include an I/O controller 223 connected to more than one input/output device 230A-230N.

FIG. 3 illustrates one embodiment of a computing device 300, where the client machine 140 and server 106 illustrated in FIG. 1 can be deployed as and/or executed on any embodiment of the computing device 300 illustrated and described herein. Included within the computing device 300 is a system bus 350 that communicates with the following components: a bridge 370, and a first I/O device 330a. In another embodiment, the bridge 370 is in further communication with the main central processing unit 321, where the central processing unit 321 can further communicate with a second I/O device 330b, a main memory 322, and a cache memory 340. Included within the central processing unit 321, are I/O ports, a memory port 303, and a main processor.

Embodiments of the computing machine 300 can include a central processing unit 321 characterized by any one of the following component configurations: logic circuits that respond to and process instructions fetched from the main memory unit 322; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 322 may include any combination of the following: a microprocessor, a microcontroller, a central processing unit with a single processing core, a central processing unit with two processing cores, or a central processing unit with more than one processing core.

While FIG. 3 illustrates a computing device 300 that includes a single central processing unit 321, in some embodiments the computing device 300 can include one or more processing units 321. In these embodiments, the computing device 300 may store and execute firmware or other executable instructions that, when executed, direct the one or more processing units 321 to simultaneously execute instructions or to simultaneously execute instructions on a single piece of data. In other embodiments, the computing device 300 may store and execute firmware or other executable instructions that, when executed, direct the one or more processing units to each execute a section of a group of instructions. For example, each processing unit 321 may be instructed to execute a portion of a program or a particular module within a program.

In some embodiments, the processing unit 321 can include one or more processing cores. For example, the processing unit 321 may have two cores, four cores, eight cores, etc. In one embodiment, the processing unit 321 may comprise one or more parallel processing cores. The processing cores of the processing unit 321, may in some embodiments access available memory as a global address space, or in other embodiments, memory within the computing device 300 can be segmented and assigned to a particular core within the processing unit 321. In one embodiment, the one or more processing cores or processors in the computing device 300 can each access local memory. In still another embodiment, memory within the computing device 300 can be shared amongst one or more processors or processing cores, while other memory can be accessed by particular processors or subsets of processors. In embodiments where the computing device 300 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 300 includes one or more processing units 321, or a processing unit 321 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 300, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 321. In other embodiments, the computing device 300 can include one or more processing units 321, where at least one processing unit 321 is dedicated to processing and rendering graphics.

One embodiment of the computing machine 300 includes a central processing unit 321 that communicates with cache memory 340 via a secondary bus also known as a backside bus, while another embodiment of the computing machine 300 includes a central processing unit 321 that communicates with cache memory via the system bus 350. The local system bus 350 can, in some embodiments, also be used by the central processing unit to communicate with more than one type of I/O device 330a-330n. In some embodiments, the local system bus 350 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 300 include an I/O device 330a-330n that includes a video display 224 that communicates with the central processing unit 321. Still other versions of the computing machine 300 include a processor 321 connected to an I/O device 330a-330n via any one of the following connections: HyperTransport, Rapid I/O, or InfiniBand. Further embodiments of the computing machine 300 include a processor 321 that communicates with one I/O device 330a using a local interconnect bus and a second I/O device 330b using a direct connection.

The computing device 300, in some embodiments, includes a main memory unit 322 and cache memory 340. The cache memory 340 can be any memory type, and in some embodiments can be any one of the following types of memory: SRAM; BSRAM; or EDRAM. Other embodiments include cache memory 340 and a main memory unit 322 that can be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 321 that can access the main memory 322 via: a system bus 350; a memory port 303; or any other connection, bus or port that allows the processor 321 to access memory 322.

One embodiment of the computing device 200/300 provides support for any one of the following installation devices 216: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 220, or any portion of a client agent 220. The computing device 200/300 may further include a storage device 228 that can be either one or more hard disk drives, or one or more redundant arrays of independent disks; where the storage device is configured to store an operating system, software, programs applications, or at least a portion of the client agent 220. A further embodiment of the computing device 200, 300 includes an installation device 216 that is used as the storage device 228.

The computing device 200, 300 may further include a network interface 218 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 200, 300 includes a network interface 218 able to communicate with additional computing devices 200', 300' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 218 can comprise any one of: a built-in network adapter; a network interface card; a PCMCIA network card; a card bus network adapter; a wireless network adapter; a USB network adapter; a modem; or any other device suitable for interfacing the computing device 200, 300 to a network capable of communicating and performing the methods and systems described herein.

Embodiments of the computing device 200, 300 include any one of the following I/O devices 230a-230n: a keyboard 226; a pointing device 227; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 223 may in some embodiments connect to multiple I/O devices 230a-230n to control the one or more I/O devices. Some embodiments of the I/O devices 230a-230n may be configured to provide storage or an installation medium 216, while others may provide a universal serial bus (USB) interface for receiving USB storage devices such as the USB Flash Drive line of devices manufactured by Twintech Industry, Inc. Still other embodiments include an I/O device 230 that may be a bridge between the system bus 250 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 200, 300 can connect to multiple display devices 224a-224n, in other embodiments the computing device 100 can connect to a single display device 224, while in still other embodiments the computing device 200, 300 connects to display devices 224a-224n that are the same type or form of display, or to display devices that are different types or forms. Embodiments of the display devices 224a-224n can be supported and enabled by the following: one or multiple I/O devices 230a-230n; the I/O controller 223; a combination of I/O device(s) 230a-230n and the I/O controller 223; any combination of hardware and software able to support a display device 224a-224n; any type and/or form of video adapter, video card, driver, and/or library to interface, communicate, connect or otherwise use the display devices 224a-224n. The computing device 200, 300 may in some embodiments be configured to use one or multiple display devices 224A-224N, these configurations include: having multiple connectors to interface to multiple display devices 224A-224N; having multiple video adapters, with each video adapter connected to one or more of the display devices 224A-224N; having an operating system configured to support multiple displays 224A-224N; using circuits and software included within the computing device 200 to connect to and use multiple display devices 224A-224N; and executing software on the main computing device 200 and multiple secondary computing devices to enable the main computing device 200 to use a secondary computing device's display as a display device 224A-224N for the main computing device 200. Still other embodiments of the computing device 200 may include multiple display devices 224A-224N provided by multiple secondary computing devices and connected to the main computing device 200 via a network.

In some embodiments, the computing machine 200 can execute any operating system, while in other embodiments the computing machine 200 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 200 can execute multiple operating systems. For example, the computing machine 200 can execute PARALLELS or another virtualization platform that can execute or manage a virtual machine executing a first operating system, while the computing machine 200 executes a second operating system different from the first operating system.

The computing machine 200 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 200 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

In some embodiments, the computing device 200 may have different processors, operating systems, and input devices consistent with the device. For example, in one embodiment, the computing device 200 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 200 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 200 is a mobile device manufactured by Nokia of Finland, or by Sony Ericsson Mobile Communications AB of Lund, Sweden.

In still other embodiments, the computing device 200 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 200 is a smart phone, Pocket PC, Pocket PC Phone, or other handheld mobile device supporting Microsoft Windows Mobile Software. Moreover, the computing device 200 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 200 is a digital audio player. In one of these embodiments, the computing device 200 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 200 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 200 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 200 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4MPEG-4 (H.264/MPEG-4 AVC) video file formats.

In some embodiments, the computing device 200 comprises a combination of devices, such as a mobile phone combined with a digital audio player or portable media player. In one of these embodiments, the computing device 200 is a Motorola RAZR or Motorola ROKR line of combination digital audio players and mobile phones. In another of these embodiments, the computing device 200 is an iPhone smartphone, manufactured by Apple Computer of Cupertino, Calif. While FIGS. 1-3 may be described with respect to specific examples of hardware and/or software that may be used, such examples are in no way limiting, but instead are merely illustrative of the type of resources that may be utilized as technology progresses.

FIGS. 1-3 show a high-level architecture of an illustrative desktop virtualization system. As shown, the desktop virtualization system may be single-server or multi-server system, or cloud system, including at least one virtualization server 106 configured to provide virtual desktops and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Illustrated in FIG. 4 is one embodiment of a computer device 401 configured as a virtualization server in a virtualization environment, for example, a single-server, multi-server, or cloud computing environment. The virtualization server 401 illustrated in FIG. 1 can be deployed as and/or implemented by one or more embodiments of the server 106 illustrated in FIG. 1 or the computing devices 200 and 300 illustrated in FIGS. 2 and 3. Included in virtualization server 401 is a hardware layer 410 that can include one or more physical disks 404, one or more physical devices 406, one or more physical processors 408 and a physical memory 416. In some embodiments, firmware 412 can be stored within a memory element in the physical memory 416 and can be executed by one or more of the physical processors 408. The virtualization server 401 may further include an operating system 414 that may be stored in a memory element in the physical memory 416 and executed by one or more of the physical processors 408. Still further, a hypervisor 402 may be stored in a memory element in the physical memory 416 and can be executed by one or more of the physical processors 408. Executing on one or more of the physical processors 408 may be one or more virtual machines 432A-C (generally 432). Each virtual machine 432 may have a virtual disk 426A-C and a virtual processor 428A-C. In some embodiments, a first virtual machine 432A may execute, on a virtual processor 428A, a control program 420 that includes a tools stack 424. In other embodiments, one or more virtual machines 432B-C can execute, on a virtual processor 428B-C, a guest operating system 430A-B.

Further referring to FIG. 4, and in more detail, the virtualization server 401 may include a hardware layer 410 with one or more pieces of hardware that communicate with the virtualization server 401. In some embodiments, the hardware layer 410 can include one or more physical disks 404, one or more physical devices 406, one or more physical processors 408, and one or more memory 416. Physical components 404, 406, 408, and 416 may include, for example, any of the components described above in FIGS. 1-3. For instance, physical disks 404 may include permanent memory storage, temporary memory storage, disk drives (e.g. optical, floppy, tape), hard disks, external hard drives, flash memory, network-attached storage, a storage-area network, or any other storage repository that the virtualization server 401 can access. Physical devices 406 may include any device included in the virtualization server 401 and/or any combination of devices included in the virtualization server 401 and external devices that communicate with the virtualization server 401. A physical device 406 may be, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with the virtualization server 401. The physical memory 416 in the hardware layer 410 may include any type of memory. The physical memory 416 may store data, and in some embodiments may store one or more programs, or set of executable instructions. FIG. 4 illustrates an embodiment where firmware 412 is stored within the physical memory 416 of the virtualization server 401. Programs or executable instructions stored in the physical memory 416 can be executed by the one or more processors 408 of the virtualization server 401.

Virtualization server 401 may also include a hypervisor 402. In some embodiments, hypervisor 402 may be a program executed by processors 408 on the virtualization server 401 to create and manage any number of virtual machines 432. The hypervisor 402 can be referred to as a virtual machine monitor, or platform virtualization software. In some embodiments, a hypervisor 402 can be any combination of executable instructions and hardware that monitors virtual machines executing on a computing machine. Hypervisor 402 may be Type 2 hypervisor, or a hypervisor that executes within an operating system 414 executing on the virtualization server 401. A Type 2 hypervisor, in some embodiments, executes within an operating system 414 environment and virtual machines execute at a level above the hypervisor. In many embodiments, the Type 2 hypervisor executes within the context of a user's operating system such that the Type 2 hypervisor interacts with the user's operating system. In other embodiments, one or more virtualization servers 401 in a virtualization environment may include a Type 1 hypervisor (Not Shown). A Type 1 hypervisor may execute on the virtualization server 401 by directly accessing the hardware and resources within the hardware layer 410. That is, while a Type 2 hypervisor 402 accesses system resources through a host operating system 414, a Type 1 hypervisor may directly access all system resources without needing a host operating system 414. A Type 1 hypervisor may execute directly on one or more physical processors of 408 the virtualization server 401, and may include program data stored in the physical memory 416.

The hypervisor 402, in some embodiments, can provide virtual resources to operating systems 430 or control programs 420 executing on virtual machines 432 in any manner that simulates the operating systems 430 or control programs 420 having direct access to system resources. System resources can include: physical devices 406; physical disks 404; physical processors 408; physical memory 416 and any other component included in the virtualization server 401 hardware layer 410. In these embodiments, the hypervisor 402 may be used to emulate virtual hardware, partition physical hardware, virtualize physical hardware, or execute virtual machines that provide access to computing environments. In still other embodiments, the hypervisor 402 controls processor scheduling and memory partitioning for a virtual machine 432 executing on the virtualization server 401. Hypervisor 402 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a virtualization server 401 executes a hypervisor 402 that creates a virtual machine platform on which guest operating systems may execute. In these embodiments, the virtualization server 401 can be referred to as a host server. An example of such a virtualization server is the XEN SERVER provided by Citrix Systems, Inc., of Fort Lauderdale, Fla.

The hypervisor 402 may create one or more virtual machines 432B-C (generally 432) in which guest operating systems 430 execute. In some embodiments, the hypervisor 402 may load a virtual machine image to create a virtual machine 432. In other embodiments, the hypervisor 402 may execute a guest operating system 430 within the virtual machine 432. In still other embodiments, the virtual machine 432 may execute the guest operating system 430.

In addition to creating virtual machines 432, the hypervisor 402 may control the execution of at least one virtual machine 432. In other embodiments, the hypervisor 402 may present at least one virtual machine 432 with an abstraction of at least one hardware resource provided by the virtualization server 401 (e.g., any hardware resource available within the hardware layer 410). In other embodiments, the hypervisor 402 may control the manner in which virtual machines 432 access the physical processors 408 available in the virtualization server 401. Controlling access to the physical processors 408 may include determining whether a virtual machine 432 should have access to a processor 408, and how physical processor capabilities are presented to the virtual machine 432.

As shown in the example of FIG. 4, the virtualization server 401 may host or execute one or more virtual machines 432. A virtual machine 432 may include a set of executable instructions that, when executed by a processor 408, imitate the operation of a physical computer such that the virtual machine 432 can execute programs and processes much like a physical computing device. While FIG. 4 illustrates an embodiment where a virtualization server 401 hosts three virtual machines 432, in other embodiments the virtualization server 401 can host any number of virtual machines 432. The hypervisor 402, in some embodiments, provides each virtual machine 432 with a unique virtual view of the physical hardware, memory, processor and other system resources available to that virtual machine 432. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. For instance, the hypervisor 402 may create one or more unsecure virtual machines 432 and one or more secure virtual machines 432. Unsecure virtual machines 432 may be prevented from accessing resources, hardware, memory locations, and programs that secure virtual machines 432 may be permitted to access. In other embodiments, the hypervisor 402 may provide each virtual machine 432 with a substantially similar virtual view of the physical hardware, memory, processor and other system resources available to the virtual machines 432.

Each virtual machine 432 may include a virtual disk 426A-C (generally 426) and a virtual processor 428A-C (generally 428.) The virtual disk 426, in some embodiments, is a virtualized view of one or more physical disks 404 of the virtualization server 401, or a portion of one or more physical disks 404 of the virtualization server 401. The virtualized view of the physical disks 404 can be generated, provided and managed by the hypervisor 402. In some embodiments, the hypervisor 402 provides each virtual machine 432 with a unique view of the physical disks 404. Thus, in these embodiments, the virtual disk 426 included in each virtual machine 432 can be unique when compared with the other virtual disks 426.

A virtual processor 428 can be a virtualized view of one or more physical processors 408 of the virtualization server 401. In some embodiments, the virtualized view of the physical processors 408 can be generated, provided and managed by the hypervisor 402. In some embodiments, the virtual processor 428 has substantially all of the same characteristics of at least one physical processor 408. In other embodiments, the hypervisor 402 provides a modified view of the virtual processor 428 such that at least some of the characteristics of the virtual processor 428 are different than the characteristics of the corresponding physical processor 408.

Having described various examples of desktop virtualization systems in FIGS. 1-3 and virtualization servers in FIG. 4, the following paragraphs provide additional examples of various methods and systems relating to creating and managing server farms in desktop virtualization systems. As used herein, a server farm refers to a set of servers logically grouped together to support one or more tenants in a desktop virtualization system. Server farms may include a single server or multiple servers, and the servers within a server farm may include physical servers, virtual servers, or a combination of physical and virtual servers. A tenant refers to a customer of the desktop virtualization system. A tenant may be an organization having multiple users with multiple client devices 140 that will be used to access virtual machines 432 in the desktop virtualization system. For example, a cloud service provider (CSP) may provide a cloud desktop virtualization system to multiple different tenants, assigning each tenant to a server farm comprising servers within the CSP's server pool.

Referring to FIG. 5, a resource pool 501 (or server pool) is shown for a desktop virtualization system, such as cloud computing environment. As described in greater detail below, a server farm manager 510 may be configured to create server farms 530 using a set of available servers 520 in the resource pool 501, and to allocate (or assign) the server farms 530 to the tenants of the desktop virtualization system. In this example, server farm 530a is allocated to Tenant A, server farm 530b is allocated to Tenants B, C, and D, and server farm 530c is unallocated.

Server farms 530a-530c each include a set of one or more servers (i.e., physical and/or virtual servers) configured to support one or more tenants. Each server in a server farm 530 may have software installed allowing the server to operate as a virtualization server 401. Each server farm 530 may include a database to define certain properties and characteristics of the server farm. A server farm database may be located within one of the server farm's servers or at a separate storage location. A server farm database may store, for example, a name or identifier for the server farm, information identifying each of the servers in the farm, and configuration settings for the farm. The configuration settings for a server farm may define the isolation level of the server farm and the election and load balancing processes used to determine which virtual machines 432 should be instantiated on which servers in the server farm. The server farm database may also define the users, security policies, and the set of applications that will be available to the tenants of the server farm 530. For example, server farm 530a may provide its tenants with one isolation level and one set of client software applications (e.g., email and word processing applications), and server farm 530b may provide its tenants with a different isolation level and a different set of client software applications (e.g., Internet browsing and document collaboration applications).

As shown in FIG. 5, different server farms 530 may comprise different numbers of servers. The individual servers in server farms 530 may be installed with client applications (e.g., word processing, email, Internet browsing applications, etc.) and may include the software to remotely host and deliver the client applications to the server farm's tenants. Server farms 530 may also include servers configured to function as access gateways and/or web servers. Access gateways may be used to make the secure connections with the client devices 140 and handle authentication credentials (e.g., establishing a virtual private network (VPN)), and web servers may provide the initial web pages to the client devices 140 and then forward the client requests to the application hosting servers in the server farm 530. Certain server farms 530 may have dedicated access gateways and web servers, while others may share access gateways and/or web servers between multiple server farms 530.

Certain tenants in a desktop virtualization system may be assigned a dedicated server farm 530 (e.g., 530a). For example, a highly secure tenant requiring a high level of isolation in a cloud computing system (e.g., a financial institution or governmental entity) may request an exclusive server farm 530, including its own access gateway and web server, from a cloud service provider (CSP). Other tenants may be assigned their own exclusive server farm 530 by the CSP, even if the tenant has not requested an exclusive server farm. For instance, tenants requiring large numbers of servers with high amounts of network traffic between the servers (e.g., large businesses or educational institutions) may be assigned exclusive server farms 530 by the CSP to improve the performance and efficiency of the system. In this example, the exclusive server farm 530 may potentially share access gateways and/or web servers with other server farms 530. Other tenants in the cloud system (e.g., smaller scale tenants and/or less secure tenants) might not require their own server farm 530 and may be assigned by the CSP to a multi-tenant server farm (e.g., 530b).

The server farm manager 510 may be implemented in hardware, software, or a combination of the two. The server farm manager 510 may be configured to monitor the available servers 520 and the server farms 530 in the desktop virtualization system. Based on the status of the available servers 520 and server farms 530, and based on the assignments of tenants to server farms 530, the server farm manager 510 may create or instantiate new server farms 530 using the available servers 520, and may destroy or shut down existing server farms 530 and return those servers to the pool of available servers 520. As described below in reference to FIG. 6, the server farm manager 510 may monitor the number of unallocated server farms 530 in the desktop virtualization system, that is, the number of server farms 530 that do not have any assigned tenants. The server farm manager 510 may create new unallocated server farms 530 as needed to maintain a minimum threshold number of unallocated server farms 530 in the desktop virtualization system. When an excess number of server farms 530 are unallocated, the server farm manager 510 may destroy one or more of the unallocated server farms 530, or may allocate one or more of the unallocated server farms to tenants of the desktop virtualization system.

Referring now to FIG. 6, a flow diagram is shown illustrating a method of managing unallocated server farms. In this example, a server farm manager 510 may be configured to maintain an allocation status (e.g., allocated, unallocated, etc.) for each server farm 530 in a desktop virtualization system. The server farm manager 510 also may be configured to determine the types and characteristics of the server farms 530, and the number of available servers 520 in the desktop virtualization system, in order to make determinations to create and destroy unallocated server farms 530. As described below, the server farm manager 510 may maintain a minimum number of unallocated server farms, so that new or existing tenants that require an exclusive server farm may be quickly assigned to a previously created unallocated server farm, rather than requiring the tenant to wait for a new unallocated server farm to be created.

In step 601, the server farm manager 510 detects a trigger or other condition to begin a process for managing unallocated server farms in a desktop virtualization system. A software trigger executing within the server farm manager 510 (e.g., within a background process) may detect a condition and initiate a server farm management process. One type of trigger may relate to the allocation or deallocation of server farms to tenants. For example, the server farm manager 510 may have a trigger that automatically initiates a server farm management process every time a previously unallocated server farm is allocated to a tenant. This trigger may be implemented, for example, by continuously monitoring the allocation status of each server farm 530 in the desktop virtualization system, or by building a hook into the software code that allocates server farms to tenants. As another example, the server farm manager 510 may have a trigger to initiate the server farm management process whenever the number of tenants changes for the desktop virtualization system. Another type of trigger may detect a change in the number of available servers 520 (e.g., the virtual or physical servers in the desktop virtualization system resource pool that are not part of a server farm 530).

Rather than using software triggers that detect specific conditions within the desktop virtualization system, the server farm manager 510 may make the determination to initiate the server farm management process based on a predetermined time schedule (e.g., every hour, day, week, etc.). The server farm manager 510 also may be configured to allow users (e.g., system administrators, cloud operators) to initiate server farm management processes on demand. In certain embodiments, the server farm manager 510 may allow users to select and configure triggers, time schedules, and other conditions for initiating the server farm management processes.

In step 602, the server farm manager 510 retrieves a threshold for a number of unallocated server farms 530 in the desktop virtualization system. For example, the server farm manager 510 may store a threshold number of unallocated server farms (e.g., 0, 1, 2, 3, . . . 10, . . . , 100, . . . , 1000, etc.). A threshold of "1" would indicate that the desktop virtualization system should maintain at least one unallocated server farm, a threshold of "10" would indicate that the desktop virtualization system should maintain at least ten unallocated server farms, etc. The unallocated server farm threshold also may be represented as a percentage of the server farms in the desktop virtualization system (e.g., 1%, 5%, 10%, etc.). A percentage threshold of "5%" would indicate that at least five percent of the server farms in the desktop virtualization system should be unallocated (i.e., up to 95% may be allocated to tenants), etc. Thresholds may also represent maximum number thresholds, or ranges of numbers of unallocated server farms 530. For example, a maximum threshold of "5" may indicate that the desktop virtualization system should contain no more than five unallocated server farms 530, and that any excess server farms 530 should be destroyed and the servers returned to the available server pool.

The unallocated server farm thresholds may be stored in memory and maintained by the server farm manager 510. For example, thresholds may be hardcoded into the software code of the server farm manager 510, or may be maintained as a configurable value that may be set, viewed, and updated by users (e.g., system administrators, cloud operators, etc.) with authorization to set the thresholds of unallocated server farms 530 for the desktop virtualization system.

In certain scenarios, multiple unallocated server farm thresholds may be stored corresponding to different sizes, types, or characteristics of server farms 530. For example, a cloud computing system that uses primarily 2-server and 3-server farms 530 may store one threshold value for unallocated 2-server farms, and a second threshold value for unallocated 3-server farms. In this scenario, the cloud service provider may set the thresholds to "1" and "2," respectively, indicating that at least one 2-server unallocated server farm and at least two 3-server unallocated server farms should be maintained within the cloud system. The server farm manager 510 may also store different thresholds for different types and characteristics of server farms 530, for example, different isolation levels, different sets of client applications, different load balancing or election policies, etc. For instance, the server farm manager 510 may store a first threshold of "5" for server farms having a high isolation level, and second threshold of "3" for server farms having a lower isolation level. Individual thresholds also may be associated with combinations of server farms sizes, types, and characteristics. For example, a single threshold number (or percentage) of unallocated server farms 530 may relate to particular size (or size range), a particular isolation level, and one or more other factors.

In step 603, the server farm manager 510 determines the number of unallocated server farms 530 in the desktop virtualization system. In certain scenarios, the server farm manager 510 or other component within the desktop virtualization system may maintain a list of all server farms 530 in the system. Each time a new server farm 530 is created or an existing server farm 530 is destroyed, the list may be updated to reflect the current set of server farms 530 in the system. Additionally, each server farm 530 may have an associated allocation status indicating whether the server farm 530 is allocated to one or more tenants (e.g., "ALLOCATED" or "UNALLOCATED"). If a server farm 530 is allocated, its allocation status also may indicate the number of tenants assigned to the farm. The allocation status of a server farm 530 may be stored and maintained by the server farm manager 510 or other component within the desktop virtualization system. In other scenarios, individual server farms 530 may store the allocation status the farm, for example, within its server farm database.

In step 604, the server farm manager 510 determines if the number of unallocated server farms 530 in the desktop virtualization system is less than the unallocated server farm threshold. If the number of unallocated server farms 530 is less than the threshold (604:Yes), then one or more additional unallocated server farms 530 may be created in step 605. For example, if an unallocated server farm threshold is "5", and there are only two unallocated server farms currently in the system, then the server farm manager 510 may initiate the processes to create three new unallocated server farms 530 from the pool of available server 520. To create the new server farms 530, the server farm manager 510 may invoke a script to select the available servers 520, install the desktop virtualization software (e.g., client applications, remote hosting and application delivery software), and create the server farm database.

As described above, multiple unallocated server farm thresholds may be used in certain scenarios. For example, different thresholds may be maintained for unallocated server farms of different sizes, different types, different characteristics, etc. In such scenarios, the server farm manager 510 may determine whether a sufficient number of server farms are present in the desktop virtualization system to satisfy each of the thresholds. For instance, the server farm manager 510 may determine that a first threshold relating to a number of 2-server farms is satisfied, but a second threshold relating to a number of 3-server farms is not satisfied. In this case, the server farm manager 510 may create a number of 3-server farms in step 605, but might not create any 2-server farms.

Although step 605 relates to creating new unallocated server farms 530, the server farm manager 510 may maintain and enforce maximum thresholds and/or threshold ranges as well. Similar comparisons and determinations may be performed for maximum thresholds and ranges, so that if the number of unallocated server farms exceeds a maximum threshold or falls outside of a threshold range, then one or more server farms may be destroyed rather than created in step 605. When a server farm is destroyed, the virtualization software and/or client applications may be removed from the servers within the farm and the server farm database may be deleted. The individual servers from the server farm may be no longer logically connected and may be returned to the pool of available servers 520.

In certain scenarios, the server farm manager 510 may apply a priority system if sufficient resources are not available to create all of the server farms 530 required by the unallocated server farm thresholds and/or other rules of the desktop virtualization system. For example, if the determinations in step 604 indicate that several low-isolation server farms and high-isolation server farms should be created in step 605, the server farm manager 510 may determine that there are not enough available servers 520 in the desktop virtualization system to satisfy both the low-isolation and high-isolation server farm thresholds. In this example, the server farm manager 510 may store and maintain a threshold priority rule to determine which unallocated server farm threshold should be satisfied in the event that not all of the thresholds can be satisfied. Additionally, the determinations to create new server farms in step 604 may conflict with other rules of the desktop virtualization server (e.g., rules governing the total number of server farms that are allowed in the system, rules governing the minimum number of available servers 520 that should be maintained by the system, etc.). In these scenarios, the server farm manager 510 or other component within the desktop virtualization system may store and maintain a set of priority rules indicating which thresholds or rules should be prioritized over other thresholds or rules. These priority rules may be hardcoded in the desktop virtualization system, or may be configured to allow users set and update the priority rules.

In step 606, the server farm manager 510 may update the allocation status of the server farms 530 created in step 605 to indicate that the newly created farms are unallocated. Additional status data for the overall desktop virtualization system (e.g., number of server farms, percentage of allocated server farms, number of available servers, etc.) also may be updated by the server farm manager 510. For example, if any server farms 530 are created or destroyed during the unallocated server farm management processes, the number of server farms 530 and number of available server 520 may be updated.

In step 607, the server farm manager 510, or other components within the desktop virtualization system, may perform one or more configuration and association processes on the server farms created in step 605. As mentioned above, the configuration and association of new unallocated server farms 530 in step 607 may occur after the server farms are created in step 605. That is, a server farm 530 might be created in response to a trigger or other condition detected in step 601, but that server farm 530 might not be configured and associated with a tenant until much later (e.g., hours, days, weeks, etc.), after a request is received (e.g. from a salesperson or technical personnel of a cloud service provider) to assign a tenant to an unallocated server farm 530. The request may be part of a process of demoing the desktop virtualization system for a potential customer tenant, on-boarding a new customer tenant, or transitioning an existing customer tenant from a currently allocated server farm 530 to a new unallocated server farm 530.

During the configuration and association processes, the server farm manager 510, or other components in the desktop virtualization system, may execute processes to create new user accounts within the infrastructure of the server farm 530 (e.g., within the server farm database, within the operating systems of the farm servers, etc.) for the tenant's users and to set the access permissions for each new user account. The server farm 530 also may be configured so that a selected list of client applications is available to the tenant's users. The isolation mode(s) of the server farm 530 also may be configured according to the tenant's requirements. For example, a server farm 530 make be configured as a private (or dedicated) farm, a shared (or multi-tenant) farm, or an isolated server farm in which multiple tenants share the farm but individual servers within the farm may be dedicated to individual tenants.

After the unallocated server farm(s) 530 are configured and associated with one or more tenant(s) in step 607, the status of the configured and associated server farms 530 may be updated to indicate the server farms have been allocated to tenants. Additional status data for the overall desktop virtualization system (e.g., the number or percentage of unallocated server farms, etc.) also may be updated, as described above in step 606. Further, as described above in reference to step 601, the process of creating new unallocated server farms 530 may be triggered by the allocation of server farms 530 to tenants. Thus, configuring and associating one or more server farms 530 with tenants in step 607 may trigger a performance of steps 601-604 to determine if additional unallocated server farms 530 should be created for the desktop virtualization system.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the spirit and scope of the following claims.

The invention claimed is:

1. A server farm management device, comprising:
at least one processor; and
memory storing computer readable instructions that, when executed by the at least one processor, configure the server farm management device to:
  retrieve a first threshold of unallocated server farms for a desktop virtualization system, wherein the first threshold is associated with a first server farm characteristic;
  retrieve a second threshold of unallocated server farms for the desktop virtualization system, wherein the second threshold is associated with a second server farm characteristic different from the first server farm characteristic;
  determine that a first number of unallocated server farms in the desktop virtualization system that have the first server farm characteristic does not satisfy the first threshold and that a second number of unallocated server farms in the desktop virtualization system that have the second server farm characteristic does not satisfy the second threshold; and
  responsive to determining that both the first threshold and the second threshold are not satisfied and determining that there are not enough available servers in the desktop virtualization system to satisfy both the first threshold and the second threshold, create one or more unallocated server farms in the desktop virtualization system having the first server farm characteristic based on determining that the first threshold has a higher priority than the second threshold.

2. The server farm management device of claim 1, the memory storing further computer readable instructions that, when executed by the at least one processor, configure the server farm management device to:
  based on detecting allocation of an allocated server farm, trigger a comparison of the first threshold of unallocated server farms to the first number of unallocated server farms that have the first server farm characteristic.

3. The server farm management device of claim 1, wherein the first server farm characteristic comprises an isolation mode of a given server farm, a set of applications available in the given server farm, a load balancing policy of the given server farm, or an election policy of the given server farm.

4. The server farm management device of claim 1, wherein creating the one or more unallocated server farms comprises:
  retrieving and executing a server farm configuration script on a plurality of available servers in the desktop virtualization system,
  wherein at least one of the server farm configuration script or a set of parameters provided to the server farm configuration script is based on the first server farm characteristic.

5. The server farm management device of claim 1, wherein the instructions, when executed by the one or more processors, cause the server farm management device to:
  determine, based on a threshold priority rule, that the first threshold has the higher priority.

6. A method comprising:
  retrieving, by a server farm management device comprising at least one processor, a first threshold of unallocated server farms for a desktop virtualization system, wherein the first threshold is associated with a first server farm characteristic of one or more allocated server farms;

retrieving, by the server farm management device, a second threshold of unallocated server farms for the desktop virtualization system, wherein the second threshold is associated with a second server farm characteristic different from the first server farm characteristic;

determining, by the server farm management device, that a first number of unallocated server farms in the desktop virtualization system that have the first server farm characteristic does not satisfy the first threshold and that a second number of unallocated server farms in the desktop virtualization system that have the second server farm characteristic does not satisfy the second threshold; and responsive to determining that both the first threshold and the second threshold are not satisfied and determining that there are not enough available servers in the desktop virtualization system to satisfy both the first threshold and the second threshold, creating, by the server farm management device, one or more unallocated server farms in the desktop virtualization system having the first server farm characteristic based on determining that the first threshold has a higher priority than the second threshold.

7. The method of claim 6, further comprising:
detecting an assignment of a tenant to a previously unallocated server farm in the desktop virtualization system; and
determining that the previously unallocated server farm has the first server farm characteristic and, in response, triggering a comparison of the first number of unallocated server farms to the first threshold.

8. The method of claim 6, wherein the first server farm characteristic is a number of servers in a given server farm.

9. The method of claim 6, wherein creating the one or more unallocated server farms comprises:
identifying one or more available servers in the desktop virtualization system; and
retrieving and executing a server farm configuration script on the one or more available servers,
wherein at least one of the server farm configuration script or a set of parameters provided to the server farm configuration script is based on the first server farm characteristic.

10. The method of claim 7, wherein the first server farm characteristic is an isolation mode of a given server and creating the one or more unallocated server farms comprises:
determining an isolation mode of the server farm allocated to the tenant; and
creating a first unallocated server farm having the same isolation mode as the server farm allocated to the tenant.

11. The method of claim 7, wherein the first server farm characteristic is a load balancing policy or an election policy of a given server farm and creating the one or more unallocated server farms comprises:

determining a load balancing or election policy of the server farm allocated to the tenant; and
creating a first unallocated server farm having the same load balancing or election policy as the server farm allocated to the tenant.

12. The method of claim 6, further comprising:
determining, by the server farm management device and based on a threshold priority rule, that the first threshold has the higher priority.

13. The method of claim 8, wherein the number of servers in the given server farm is more than one.

14. A method comprising:
detecting, by a server farm management device comprising at least one processor, an allocation to a tenant of a previously unallocated server farm in a desktop virtualization system;

determining, by the server farm management device, that the previously unallocated server farm allocated to the tenant comprises a first number of servers;

retrieving, by the server farm management device, a first threshold of unallocated server farms for the desktop virtualization system, wherein the first threshold is associated with the first number of servers;

retrieving, by the server farm management device, a second threshold of unallocated server farms for the desktop virtualization system, wherein the second threshold is associated with a second number of servers different from the first number of servers;

determining, by the server farm management device, that a first number of unallocated server farms having the first number of servers in the desktop virtualization system does not satisfy the first threshold;

determining, by the server farm management device, that a second number of unallocated server farms having the second number of servers in the desktop virtualization system does not satisfy the second threshold;

determining, by the server farm management device, that a current number of available servers in the desktop virtualization system is insufficient to satisfy both the first threshold and the second threshold;

determining, by the server farm management device and based on a threshold priority rule, that the first threshold has a higher priority than the second threshold; and responsive to determining that both the first threshold and the second threshold are not satisfied and determining that the current number of available servers in the desktop virtualization system is insufficient to satisfy both the first threshold and the second threshold, creating, by the server farm management device, one or more unallocated server farms in the desktop virtualization system based on determining that the first threshold has the higher priority, each of the one or more unallocated server farms comprising the first number of servers.

15. The method of claim 14, wherein the first number of servers in the server farm allocated to the tenant is more than one.

* * * * *